(12) United States Patent
Buck (10) Patent No.: US 8,176,330 B2
(45) Date of Patent: *May 8, 2012

(54) METHOD, APPARATUS AND ARTICLE FOR OFF-LINE CERTIFICATION IN MOBILE APPLICATIONS

(75) Inventor: Robert D. Buck, Fairfield, IA (US)

(73) Assignee: Intermec IP Corp., Everett, WA (US)

( * ) Notice: Subject to any disclaimer, the term of this patent is extended or adjusted under 35 U.S.C. 154(b) by 132 days.

This patent is subject to a terminal disclaimer.

(21) Appl. No.: 12/631,496

(22) Filed: Dec. 4, 2009

(65) Prior Publication Data

US 2010/0082996 A1 Apr. 1, 2010

Related U.S. Application Data

(62) Division of application No. 12/249,591, filed on Oct. 10, 2008, now Pat. No. 7,664,959, which is a division of application No. 10/787,994, filed on Feb. 26, 2004, now Pat. No. 7,444,516.

(51) Int. Cl.
*H04L 9/32* (2006.01)

(52) U.S. Cl. ...................................... 713/178

(58) Field of Classification Search ................ 713/178
See application file for complete search history.

(56) References Cited

U.S. PATENT DOCUMENTS

| | | | |
|---|---|---|---|
| 5,781,630 A | 7/1998 | Huber et al. | |
| 5,923,763 A | 7/1999 | Walker et al. | |
| 6,393,566 B1 | 5/2002 | Levine | |
| 6,704,612 B1 | 3/2004 | Hahn-Carlson | |
| 7,146,504 B2 | 12/2006 | Parks et al. | |
| 7,315,948 B1 | 1/2008 | Peyravian et al. | |
| 2001/0042050 A1 | 11/2001 | Fletcher et al. | |
| 2003/0163704 A1* | 8/2003 | Dick et al. | ..................... 713/178 |
| 2003/0182573 A1 | 9/2003 | Toneguzzo et al. | |
| 2003/0233556 A1 | 12/2003 | Angelo et al. | |

OTHER PUBLICATIONS

Menezes, Handbook of Applied Cryptography, CRC, 1997, § 8.2, "RSA Public-Key Encryption," pp. 285-291; §§ 11.1-11.2, "Digital Signatures," pp. 425-433; § 12.6.1, "Diffie-Hellman and Related Key Agreement Protocols," pp. 515-520; § 13.2.4, "Roles of Third Parties," pp. 547-550; § 13.4, "Techniques for Distributing Public Keys," pp. 555 566; § 13.8, "Advanced Trusted Third Party Services," pp. 581-583; § 15.3.2, "Banking Security Standards: ANSI X9.42," p. 651.

DigiStamp, Inc., "How a Digital Time Stamp Works," © 1999-2005, downloaded Jun. 25, 2005, URL=http://www.digistamp.com/works.htm, 3 pages.

Surety, LLC., "Ensuring Record Integrity with Absolute ProofSM," Product Literature, 18 pages. URL=http://www.surety.com, 2003.

Adams, C., et al., "Internet X.509 Public Key Infrastructure Time-Stamp Protocol (TSP)," IETF RFC3161, pp. 1-27, Aug. 2001.

* cited by examiner

*Primary Examiner* — Benjamin Lanier
*Assistant Examiner* — Cordelia Zecher
(74) *Attorney, Agent, or Firm* — Seed IP Law Group PLLC (57) ABSTRACT

A tamper-resistant certification device receives a certified digital time stamp from a trusted third party, resets a time function and produces a time stamp receipt in an on-line mode; The tamper-resistant certification device receives a digital file from a mobile computing device, and produces a certified digitally signed digital file including a copy of the digital file, time stamp receipt and temporal offset in an off-line mode to evidence the content of the digital file within a defined tolerance of a day and/or time. A processor may be portioned into tamper and non-tamper resistant portions.

10 Claims, 6 Drawing Sheets

METHOD, APPARATUS AND ARTICLE FOR OFF-LINE CERTIFICATION IN MOBILE APPLICATIONS

CROSS-REFERENCE TO RELATED APPLICATION

This application is a divisional of U.S. patent application Ser. No. 12/249,591, filed Oct. 10, 2008, now issued as U.S. Pat. No. 7,664,959, which is a divisional of U.S. patent application Ser. No. 10/787,994, filed on Feb. 26, 2004, and issued as U.S. Pat. No. 7,444,516, on Oct. 28, 2008, which applications are incorporated herein by reference in their entirety.

BACKGROUND OF THE INVENTION

1. Field of the Invention

This disclosure generally relates to mobile computing applications, and particularly to certification and/or authentication in mobile computing environments.

2. Description of the Related Art

There currently exist a large variety of mobile computing applications in which certification or authentication to provide proof of services would be desirable. For example, many package delivery services or couriers employ mobile computing devices (e.g., laptop and/or handheld computing devices) for tracking packages and parcels through delivery. These mobile computing devices are capable of downloading package or parcel location information from time-to-time, that permits the on-line tracking of a package or parcel through the entire delivery process. The mobile computing devices may also provide business process assurances such as "proof-of-delivery" (POD). For example, mobile computing devices may allow for electronic signature capture which may be offered as proof of delivery.

Current techniques for implementing proof-of-services rendered are far from being non-repudiable. For example, electronic bitmaps of signatures can be easily applied to receipts other than the receipt for which they are intended. Further, mobile computing systems can easily be tampered with to forge electronic receipts, electronic signatures, and even biometric data. Security is a growing concern for the delivery of documents and/or packages. Non-repudiable transaction certification is necessary as true proof-of-service or -delivery. Without such certification, service providers will have to resort to time-consuming manual business practices to establish proof of service. Such manual practices increase labor costs and increase the billing cycle time.

Cryptographic techniques can be employed advantageously in non-mobile computing environments. For example, some cryptographic techniques may be used to achieve confidentiality (i.e., keep information from all but those authorized to have access). Also, some cryptographic techniques can offer data integrity (i.e., allowing one to detect unauthorized alteration or manipulation of data such as insertion, deletion or substitution). Additionally, some cryptographic techniques may provide for authentication (i.e., allowing one to verify the origin, date of origin, data content, and time sent of both data and the sender). Further, some cryptographic techniques may be employed for non-repudiation (i.e., prevent an entity from denying previous commitments or actions). Non-repudiation typically involves a trusted third party. One cryptographic primitive is the digital signature, which is fundamental in authentication, authorization and non-repudiation. A digital signature is a means for an entity to bind its identity with a piece of information. The signing process entails transforming the message and some secret information held by the entity into a tag called a signature.

Techniques and devices to provide for non-repudiation proof-of-service and/or proof-of-delivery in mobile computing environments are highly desirable, particularly for package delivery and courier applications.

BRIEF SUMMARY OF THE INVENTION

A method of producing certifications of digital files may be summarized as including from time-to-time in an on-line mode, receiving a certified time stamp at a tamper-resistant certification device from a remote source remotely located with respect to the tamper-resistant certification device; in response to receiving the certified time stamp, providing a time stamp receipt to the remote source from the tamper-resistant certification device; from time-to-time, in an off-line mode, receiving a digital file for certification from a local source locally located with respect to the tamper-resistant certification device; determining a temporal offset from a last receipt of one of the certified time stamps received at the tamper-resistant certification device; and producing a certified digital file comprising the contents of the digital file, the time stamp receipt, and an indication of the determined temporal offset from the last receipt of one of the certified time stamps.

The method may further include from time-to-time, establishing remote communications with a remotely located trusted third party; in response to the receipt of the certified time stamp, resetting a timer function; providing a time stamp receipt to the trusted third party upon at least one of receiving the certified time stamp and a successful resetting of the timer function; and terminating the remote communications with the trusted third party.

A tamper-resistant certification device to produce certification of digital files may be summarized as including a tamper-resistant housing, having an interior and an exterior; at least one communications port accessible from the exterior of the housing; a processor received in the housing and coupled to the at least one communications port, the processor configured to: from time-to-time in an on-line mode, receive a certified time stamp at a tamper-resistant certification device from a remote source remotely located with respect to the tamper-resistant certification device; in response to receipt of the certified time stamp, provide a time stamp receipt to the remote source from the tamper-resistant certification device; and from time-to-time, in an off-line mode, receive a digital file for certification from a local source locally located with respect to the tamper-resistant certification device; determine a temporal offset from a last receipt of one of the certified time stamps received at the tamper-resistant certification device; and produce a certified digital file comprising the contents of the digital file, the time stamp receipt, and an indication of the determined temporal offset from the last receipt of one of the certified time stamps.

A processor readable medium may store instructions for causing a processor in tamper-resistant certification device to produce certification of digital files by: from time-to-time in an on-line mode, receiving a certified time stamp at a tamper-resistant certification device from a remote source remotely located with respect to the tamper-resistant certification device; in response to receiving the certified time stamp, providing a time stamp receipt to the remote source from the tamper-resistant certification device; and from time-to-time, in an off-line mode, receiving a digital file for certification from a local source locally located with respect to the tamper-resistant certification device; determining a temporal offset from a last receipt of one of the certified time stamps received at the tamper-resistant certification device; and producing a certified digital file comprising the contents of the digital file, the time stamp receipt, and an indication of the determined temporal offset from the last receipt of one of the certified time stamps.

A method of producing certifications of digital files may be summarized as including from time-to-time, providing a certified time stamp from a trusted authority to a tamper-resistant certification device; receiving a time stamp receipt for a time stamp provided to the tamper-resistant certification device from the tamper-resistant certification device at a trusted authority; receiving a request for verification of a certified digital file that includes a copy of the time stamp receipt at the trusted authority and receiving the certified digital file digitally signed with a digital signature at the trusted authority; verifying whether the digital signature authenticates the tamper-resistant device as a source of the certified digital file at the trusted authority; determining whether the copy of the time stamp receipt received as a part of the certified digital file corresponds to the received time stamp receipt at the trusted authority; and notifying a requester of an outcome of the determination.

The method may further include determining whether a temporal offset between the providing of the certified time stamp and a certification of the digital file as identified in the certified digital file and in the time stamp receipt is within a defined threshold at the trusted authority.

The method may further include employing a greater of two temporal offset values in determining whether the temporal offset between the providing of the certified time stamp and the certification of the digital file as identified in the certified digital file and in the time stamp receipt is within the defined threshold at the trusted authority.

The method may further include determining whether a count of a number of certified time stamps received by the tamper-resistant certification device as indicated in the certified digital file corresponds to the number of certified time stamps provided to the tamper-resistant certification device at the trusted authority.

A certification device for use in producing certification of digital files may be summarized as including a housing, having an interior and an exterior; at least one communications port accessible from the exterior of the housing; a processor received in the housing and coupled to the at least one communications port, the processor configured to: from time-to-time, provide a certified time stamp to a tamper-resistant certification device; receive a time stamp receipt from the tamper-resistant certification device; receive a request for verification and a certified digital file digitally signed with a digital signature; verify whether the digital signature authenticates the tamper-resistant certification device as a source of the certified digital file; determine whether a copy of the time stamp receipt received as a part of the certified digital file corresponds to the received time stamp receipt; and notify a requester of an outcome of the determination.

The certification device may be further summarized by having the processor further configured to determine whether a temporal offset between the providing of the certified time stamp and a certification of the digital file as identified in the certified digital file and in the time stamp receipt is within a defined threshold.

The certification device may be further summarized by having the processor further configured to determine whether a count of a number of certified time stamps received by the tamper-resistant certification device as indicated in the certified digital file corresponds to the number of certified time stamps provided by the certification device to the tamper-resistant certification device.

A computer readable medium storing instructions for causing a processor in a certification device to assist in certification of digital files may be summarized as including from time-to-time, providing a certified time stamp to a tamper-resistant certification device; receiving a time stamp receipt from the tamper-resistant certification device; receiving a request for verification and a certified digital file digitally signed with a digital signature; verifying whether the digital signature authenticates the tamper-resistant device as a source of the certified digital file; determining whether a copy of the time stamp receipt received as a part of the certified digital file corresponds to the received time stamp receipt; and notifying a requester of an outcome of the determination.

A method of producing certifications of digital files may be summarized as including, from time-to-time in an on-line mode, receiving a certified time stamp at a tamper-resistant portion of a processor of a tamper-resistant certification device from a remote source remotely located with respect to the tamper-resistant certification device; in response to receiving the certified time stamp, providing a time stamp receipt to the remote source from the tamper-resistant portion of the processor; and from time-to-time, in an off-line mode, receiving a digital file for certification at the tamper-resistant portion of the processor via a non-tamper resistant portion of the processor; determining a temporal offset from a last receipt of one of the certified time stamps received at the tamper-resistant portion of the processor; and producing a certified digital file comprising the contents of the digital file, the time stamp receipt, and an indication of the determined temporal offset from the last receipt of one of the certified time stamps. Receiving a certified time stamp at a tamper-resistant portion of a processor from a remote source remotely located with respect to the tamper-resistant certification device may include receiving a certified time stamp communications comprising a digital signature from a trusted third party over a network communications link, where the digital signature authenticates the trusted third party as the source of the certified time stamp. Providing a time stamp receipt, to the remote source from the tamper-resistant certification device may include transmitting a time stamp receipt communication to a trusted third party over a network communications link where the time stamp receipt communication may include a digital signature and the digital signature authenticating the tamper-resistant certification device as a sole source of the time stamp receipt. Receiving a certified time stamp at a tamper-resistant portion of a processor from a remote source remotely located with respect to the tamper-resistant certification device may occur from time-to-time while the tamper-resistant certification device is in the on-line mode. Receiving a digital file for certification at the tamper-resistant portion of the processor via a non-tamper resistant portion of the processor may occur from time-to-time while the tamper-resistant certification device is in the off-line mode.

A tamper-resistant certification device to produce certification of digital files may be summarized as including a housing, having an interior and an exterior; at least one communications port accessible from the exterior of the housing; a processor received in the housing, the processor partitioned into a tamper-resistant portion and a non-tamper resistant portion, the processor coupled to the at least one communications port, and configured to, from time-to-time in an on-line mode, receive a certified time stamp at the tamper-resistant portion of the processor from a remote source remotely located with respect to the tamper-resistant certification device; in response to receipt of the certified time stamp, provide a time stamp receipt to the remote source from the tamper-resistant certification device; and, from time-to-time in an off-line mode, receive a digital file for certification at the tamper-resistant portion of the processor; determine a temporal offset from a last receipt of one of the certified time stamps received at the tamper-resistant portion of the processor; and produce a certified digital file comprising the contents of the digital file, the time stamp receipt, and an indication of the determined temporal offset from the last receipt of one of the certified time stamps.

The processor may be further configured to increment a time stamp receipt counter in the tamper-resistant portion of the processor upon receiving the certified time stamp at the tamper-resistant portion of the processor; reset a timer function in response to receiving of the certified time stamp at the tamper-resistant portion of the processor; and provide a contents of the time stamp receipt counter in the time stamp receipt provided to the remote source from the tamper-resistant device. The digital file may be received for certification at the tamper-resistant portion of the processor from the non-tamper-resistant portion of the processor. The tamper-resistant portion of the process may be configured to receive the certified time stamp from the remote source from time-to-time while the tamper-resistant certification device is in on-line mode. The tamper-resistant portion of the process may be configured to receive the digital file for certification from time-to-time while the tamper-resistant certification device is in the off-line mode.

A method of producing certifications of digital files may be summarized as including from time-to-time, while a tamper-resistant certification device is in an on-line mode, receiving a certified time stamp at a tamper-resistant portion of a processor of a tamper-resistant certification device from a remote source remotely located with respect to the tamper-resistant certification device, wherein the tamper-resistant certification receives at a time of receipt a last certified time stamp; in response to receiving the certified time stamp, providing a time stamp receipt to the remote source from the tamper-resistant certification device; and from time-to-time, while the tamper-resistant certification device is in an off-line mode, receiving a digital file for certification at the tamper-resistant portion of the processor via a non-tamper resistant portion of the processor; determining a temporal offset from the time of receipt of the last certified time stamp received at the tamper-resistant certification device; and producing a certified digital file at the tamper-resistant certification device, the certified digital file comprising the contents of the digital file, the time stamp receipt, and an indication of the determined temporal offset from the time of receipt of the last certified time stamp. Receiving a certified time stamp at a tamper-resistant portion of a processor of a tamper-resistant certification device from a remote source remotely located with respect to the tamper-resistant certification device may include receiving a certified time stamp communications comprising a digital signature from a trusted third party over a network communications link, where the digital signature authenticates the trusted third party as the source of the certified time stamp. Providing a time stamp receipt, to the remote source from the tamper-resistant certification device may include transmitting a time stamp receipt communication to a trusted third party over a network communications link where the time stamp receipt communication comprises a digital signature and the digital signature authenticating the tamper-resistant certification device as a sole source of the time stamp receipt.

The method may further include incrementing a time stamp receipt counter in the tamper-resistant certification device upon receiving the certified time stamp at the tamper-resistant certification device; and providing a contents of the time stamp receipt counter in the time stamp receipt provided to the remote source from the tamper-resistant device.

The method may further include resetting a timer function in response to receiving of the certified time stamp at the tamper-resistant certification device. Resetting a timer function in response to receiving of the certified time stamp at the tamper-resistant certification device may include resetting a first clock in the tamper-resistant certification device and resetting a second clock in the tamper-resistant certification device, the second clock different from the first clock. Determining a temporal offset from the time of receipt of the last certified time stamp may include determining an elapsed time of a first clock of the tamper-resistant certification device, after resetting the first clock of the tamper-resistant certification device in response to receipt of the last certified time stamp by the tamper-resistant certification device. Producing a certified digital file may include producing a monolithic digital file structure including the contents of the digital file, the time stamp receipt, an indication of the determined temporal offset from the last receipt of one of the certified time stamps, and further including a device identifier uniquely identifying the tamper-resistant certification device, and a copy of the certified time stamp.

The method may further include establishing temporary communications with the remotely located source via a wide area network in the online mode to receive the certified time stamp and to provide the time stamp receipt; establishing communications with the local source via at least one of a local area network or a non-network communications link in an offline mode to receive the digital file and to produce the certified digital file, and providing the certified digital file to the local source via the at least one of the local area network or the non-network communications link.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures and methods associated with computing systems, networks, data structures, various cryptographic techniques and other data security structures and techniques have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Figure 1:
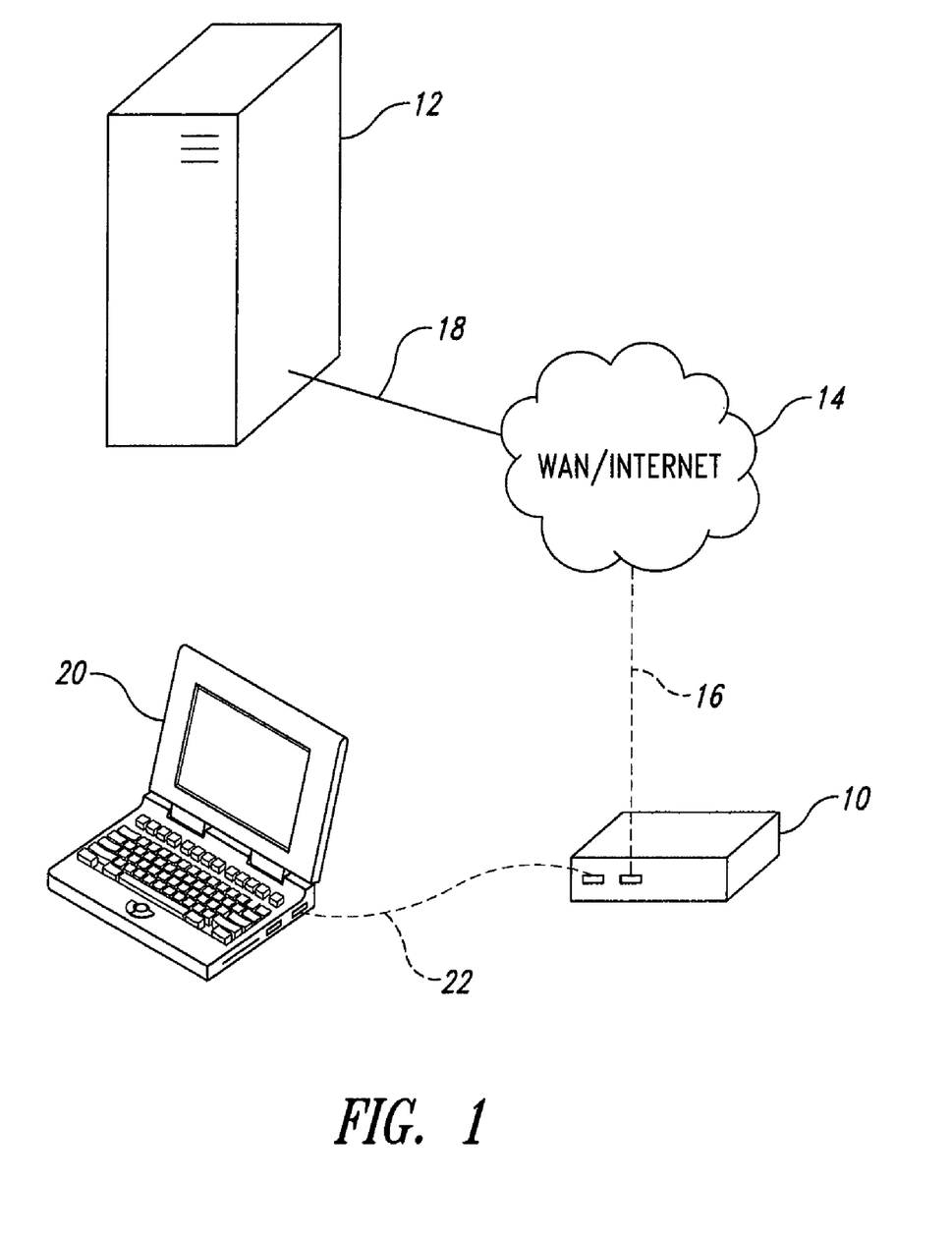
FIG. 1 is a schematic view of a computing environment according to one illustrated embodiment, comprising a tamper-resistant certification device, mobile computing system, trusted third party computing system, and a wide area communications network, such as the Internet.

FIG. 1 shows a tamper-resistant certification device 10 that may be selectively communicatively coupled to a trusted third party computing system 12, for example, via a wide area network (WAN) such as the Internet 14 during an on-line mode, as illustrated by broken line 16 and solid line 18. The tamper-resistant certification device 10 may also be selectively coupled to a mobile computing device 20 during an off-line mode, for example, via a local area network (LAN) and/or non-network communications link such as a serial or parallel cable, or infrared transceiver as illustrated by broken line 22. As will be evident to those of skill in the art from this disclosure, the tamper-resistant certification device 10 may provide a substantial improvement to the non-repudiation of proof-of-service and/or proof-of-delivery in mobile computing environments, by ensuring that certification is provided by a device that is not subject to tampering by the end-user or other individuals.

The trusted third party computing system 12 can take any of a variety of forms, such as a micro- or personal computer, a mini-computer, a workstation, or server computing system. In practice, the trusted third party computing system 12 will typically take the form of a network server, such as a web server, the details of which are commonly understood by those skilled in the art. For example, the trusted third party computing system 12 may take the form of a network server executing an operating system such as Windows NT 4.0 Server, and/or Windows 2000 Server, available from Microsoft Corporation of Redmond, Wash.

The trusted third party computing system 12 is preferably operated by a trusted third party, that is a party without a stake in the outcome of a contest between a first and second party, for example, a first party delivering a package and a second party receiving the package. The trusted third party serves as a neutral judge should some resolution be required. The neutrality of the trusted third party allows both the first and second parties to trust any decisions made by the third party.

Trusted third parties are currently known to act as certification authorities, i.e., responsible for establishing and vouching for authenticity of public keys, name servers responsible for managing a name space of unique user names, registration authorities responsible for authorizing entities distinguishing by unique names as members of a security domain, key generator (i.e., creating public, private key pairs and symmetric keys or passwords), and acting as certificate directory (i.e., a certificate database or server accessible for read-access by users). Trusted third parties are also known to serve as key servers or authentication servers, facilitating key establishment between other parties and as key management facilitators (i.e., providing a number of services including storage and archival of keys, audit collection and reporting tools). Trusted third parties are also known to act as timestamp agents, used to assert the existence of a specified document at a certain point in time or affix a trusted date to a transaction or digital message, act as notary agents (i.e., used to verify digital signatures at a given point in time to support non-repudiation or more generally establish the truth of any statement at a given point in time), and act as key escrow agents (i.e., used to provide third party access to user's secret keys under special circumstances).

The mobile computing system 20 may take any of a variety of forms, such as a micro- or personal computer, mini-computer, or workstation, but will typically take the form of a lap-top computing system or a palm-top or hand-held computing appliance. The mobile computing system may include a number of communications ports and/or cards, for establishing wired or wireless communications with external devices and/or networks. For example, such communications may occur over serial or parallel wired channels. For example, such communications may occur over wireless channels such as radio frequency (RF) including microwave communications, and/or via light including infrared.

The wide area network 14 may take any form of network, however will typically take the form of the Internet, or a proprietary intranet or extranet.

Figure 2:
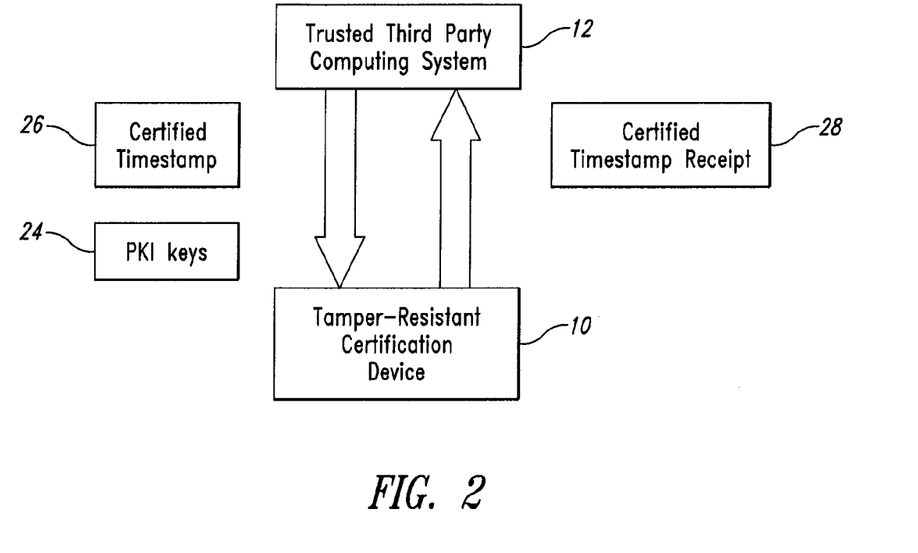
FIG. 2 is a schematic diagram showing communications between the tamper-resistant certification device and the trusted third party computing system in an on-line mode.

FIG. 2 illustrates exemplary the communications between the tamper-resistant certification device 10 and the trusted third party computing system 12 during an on-line mode, in which the tamper-resistant certification device 10 is communicatively coupled to the trusted third party computing system 12, for example via the WAN or Internet 14. The trusted third party computing system 12 may optionally provide PKI keys 24 to the tamper-resistant certification device 10, or PKI keys may be generated by the tamper-resistant certification device 10 or some other device. The trusted third party computing system 12 may also provide a certified timestamp 26 to the tamper-resistant certification device 10. In response to receipt of the certified time stamp 26, the tamper-resistant certification device 10 may provide a certified timestamp receipt 28 to the trusted third party computing system 12, as described in greater detail below.

Figure 3A:
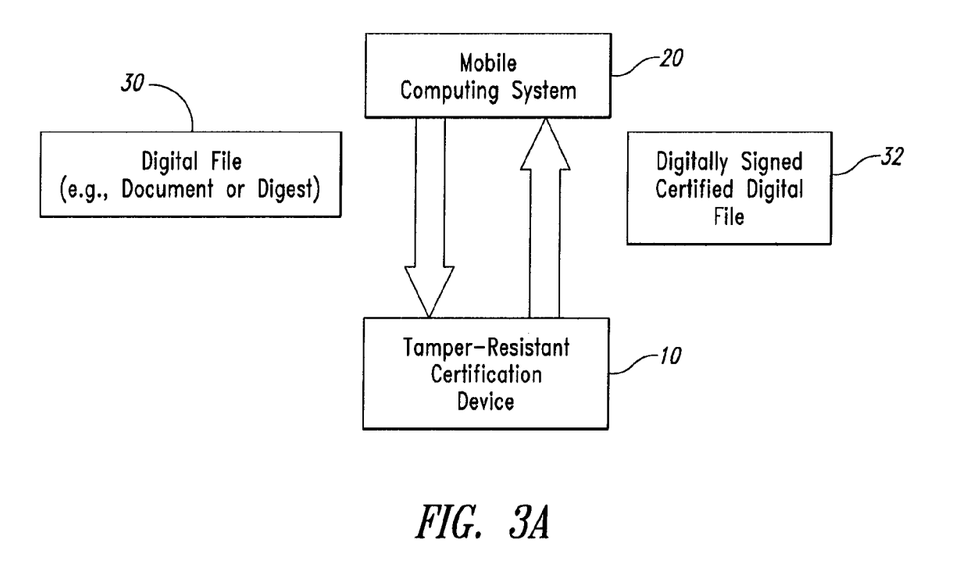
FIG. 3A is a schematic diagram showing communications between the tamper-resistant certification device and the mobile computing system during an off-line mode, according to one illustrated embodiment.

FIG. 3A illustrates exemplary communications between the tamper-resistant certification device 10 and the mobile computing system 20 during an off-line mode, in which the tamper-resistant certification device is not communicatively coupled to the trusted third party computing system 12. The mobile computing system 20 may provide a document or digest to the tamper-resistant certification device for certification in the form of a digital file 30. In response, the tamper-resistant certification device 10 may provide a digitally signed certified digital file 32 to the mobile computing system 20, as described in greater detail below.

Figure 3B:
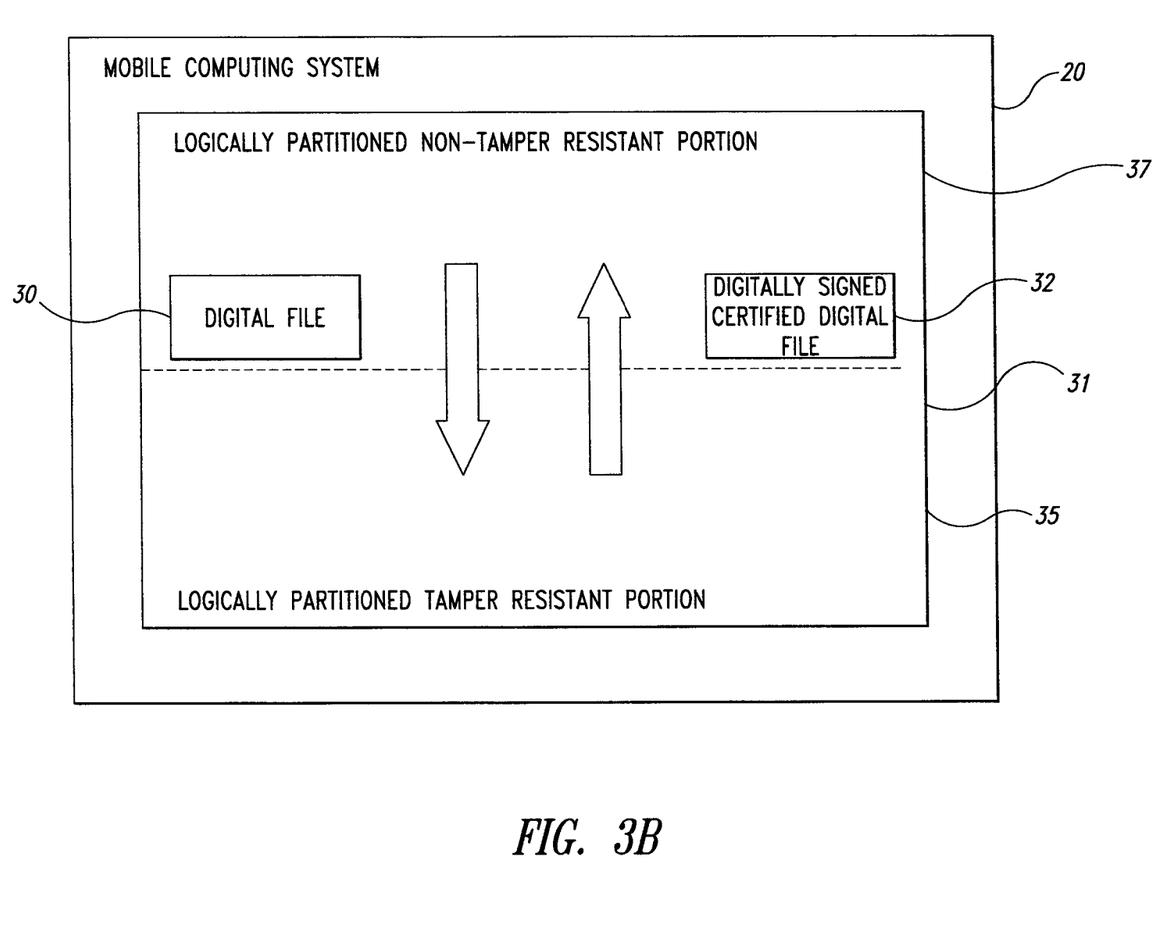
FIG. 3B is a schematic diagram showing communications between a tamper-resistant certification portion and a non-tamper-resistant portion of a logically partitioned microprocessor in the mobile computing system during an off-line mode, according to one illustrated embodiment.

FIG. 3B illustrates exemplary communications between logically partitioned portions of a processor such as a microprocessor 31 (e.g., XScale processor) in the mobile computing system 20 during the off-line mode, in which the mobile computing system 20 is not communicatively coupled to the trusted third party computing system 12. In particular, the microprocessor 31 is partitioned (e.g., logically partitioned) into a tamper-resistant portion 35 and a non-tamper resistant portion 37. The tamper-resistant portion 35 may execute a predefined set of instructions, and is not effected by changes of clock speed or loss of power without at least indicating that such a change or loss has occurred, and may require a resetting of the certification function by receipt of a new certified time stamp before creating any further digitally signing certified digital files.

Figure 4:
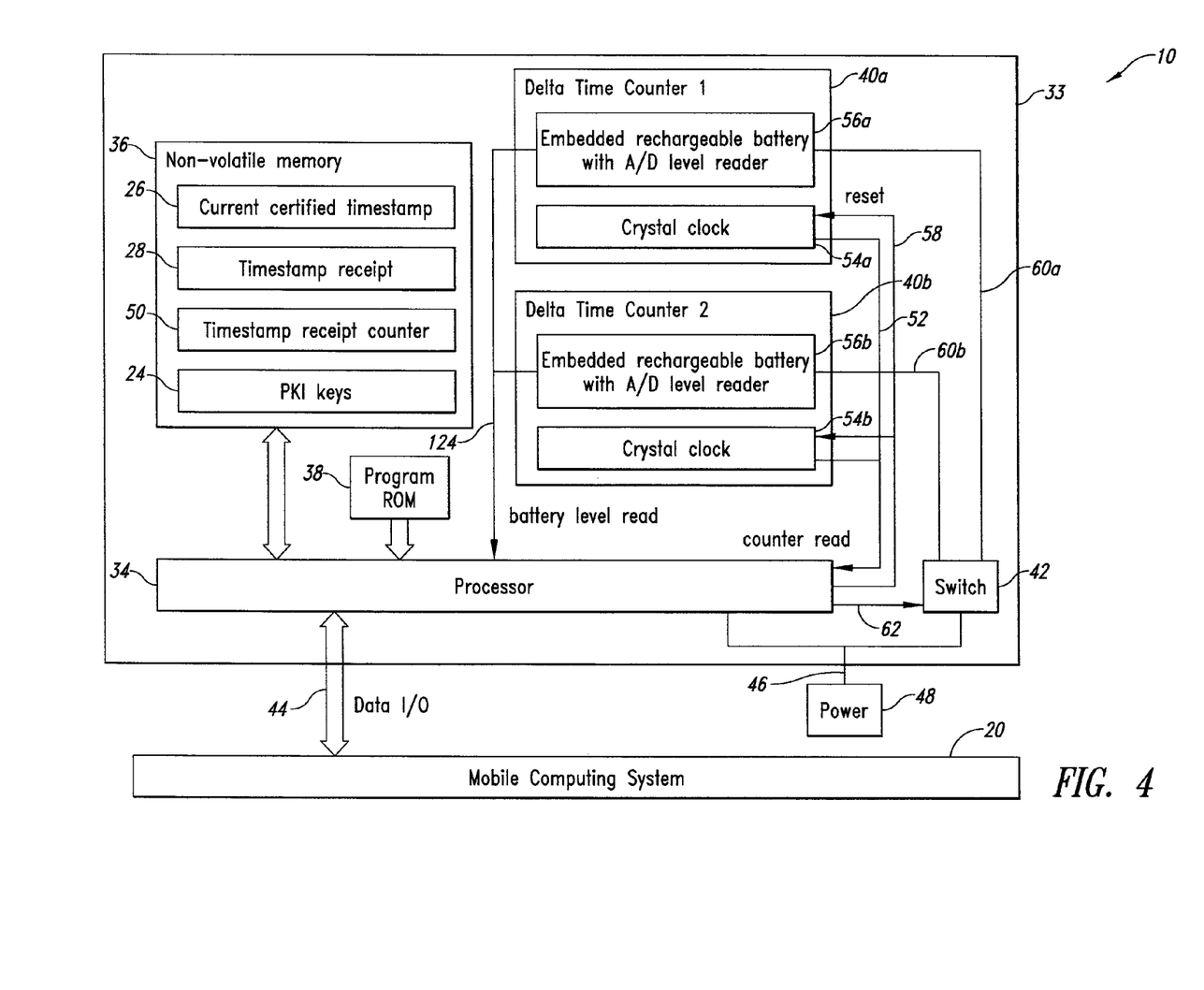
FIG. 4 is a functional block diagram showing the tamper-resistant certification device and mobile computing system according to one illustrated embodiment.

FIG. 4 is a schematic diagram of the tamper-resistant certification device 10 according to one illustrated embodiment. The tamper-resistant certification device 10 comprises a housing 33, a processor 34, nonvolatile memory 36, a timer function provided by a first delta time counter 40a and optionally a second delta time counter 40b, and a switch 42 selectively actuatable by the processor 34 for resetting the first and second delta time counters 40a, 40b, respectively. The housing 33 encloses the processor 34, nonvolatile memory 36, first delta time counter 40a, a second delta time counter 40b, and the switch 42, and protects such from tampering (i.e., tamper resistant, as discussed more fully below).

The tamper-resistant certification device 10 may include one or more communications ports or cables 44 for transmitting and/or receiving data. In some embodiments, the communications ports or cables 44 is the only external interface for the tamper-resistant certification devices 10, enhancing the tamper-resistant characteristics of the tamper-resistant certification device 10 by limiting the number of points at which the internal components may be physically or electronically accessed.

The tamper-resistant certification device 10 may optionally include a power port or cable 46 to couple to an external power source 48 which may or may not be provided from the mobile computing system 20. In such an embodiments, the tamper-resistant certification device may employ the power to recharge internal power source(s), enhancing the tamper-resistant characteristics of the tamper-resistant certification device 10 by limiting the ability to manipulate the timer function provided by the delta time counters 40a, 40b.

The processor 34 executes instructions stored in ROM 38 based on data stored in the nonvolatile memory 36 and/or ROM 38. At any given time the nonvolatile memory 36 may store one or more of PKI keys 24, current certified timestamp 26, certified timestamp receipt 28, and a timestamp receipt counter 50. The timestamp receipt counter 50 is incremented each time a certified timestamp 26 is received by the tamper-resistant certification device 10 to maintain track of the number of certified timestamps received. In particular, the processor 34 may increment the timestamp receipt counter 50 each time the delta time counters 40a, 40b are reset based on a signal sent over the counter reset line 58.

The delta time counters 40a, 40b each include a respective crystal clock 54a, 54b, respectively, and a respective embedded rechargeable battery with an analog-to-digital (ND) level reader 56a, 56b, respectively. The batteries 56a, 56b preferably have different storage capacities to prevent both batteries 56a, 56b from running out of charge at the same time. The processor 34 can provide a signal over reset line 58 to reset the crystal clocks 54a, 54b in response to receipt of a certified timestamp 26. The processor 34 receives an indication of the battery charge states via line 124. The processor 34 selects battery charge on line 62 which controls switch 42. Battery charge is supplied via either line 60a, or line 60b.

As used herein and in the claims, the term "tamper-resistant" includes devices which cannot be easily modified by tampering. Such devices may include housings 33 that protect the contents housed therein from physical access (e.g., housing that are impossible or difficult to open, or that provide an indication, visual or otherwise, that the interior of the housing has been physically accessed). This level of security prevents physical tampering, for example, physical tampering of the delta time counters 40a, 40b. In another aspect, tamper-resistant devices may also include devices which prevent the replacement of power supplies, such as batteries, or which indicate when a power supply has been replaced. In a further aspect, tamper resistant devices may include devices that prevent unauthorized changes to the configuration or programming. Examples of such devices, may include those employing firmware for storing instructions, and those which preclude changes to the operation or execution of the microprocessor, for example, devices employing an application specific integrated circuit ASIC or other special purpose computer or processor. This level of security prevents electronic tampering, for example, access to the contents of random access memory (RAM) or read only memory (ROM).

Figure 5:
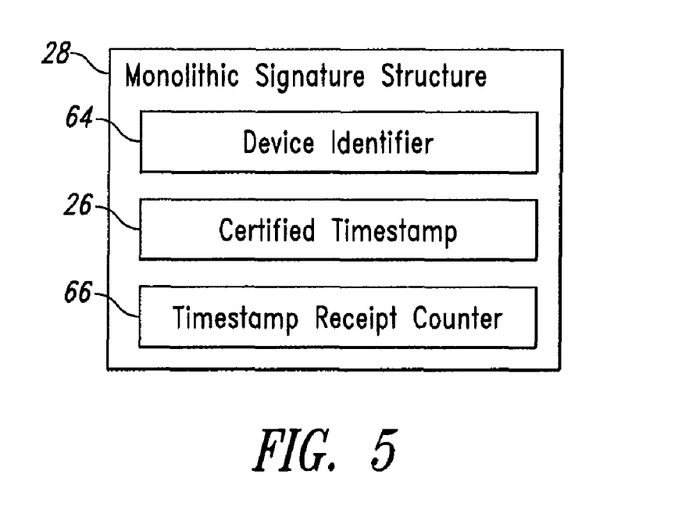
FIG. 5 is a schematic diagram structure of a certified timestamp receipt data structure returned by the tamper-resistant certification device to the trusted third party computing system according to one illustrated embodiment.

FIG. 5 shows one illustrated embodiment of a data structure for the certified time stamp receipt 28 in the form of a monolithic digital file structure comprising a device identifier 64, copy of the certified timestamp 26 and an indication 66 of the contents of the timestamp receipt counter 50 (FIG. 4). The monolithic file structure ensures that components of the certified time stamp receipt 28 may not be removed, changed, substituted or otherwise tampered, without rendering the certified time stamp receipt 28 invalid.

Figure 6:
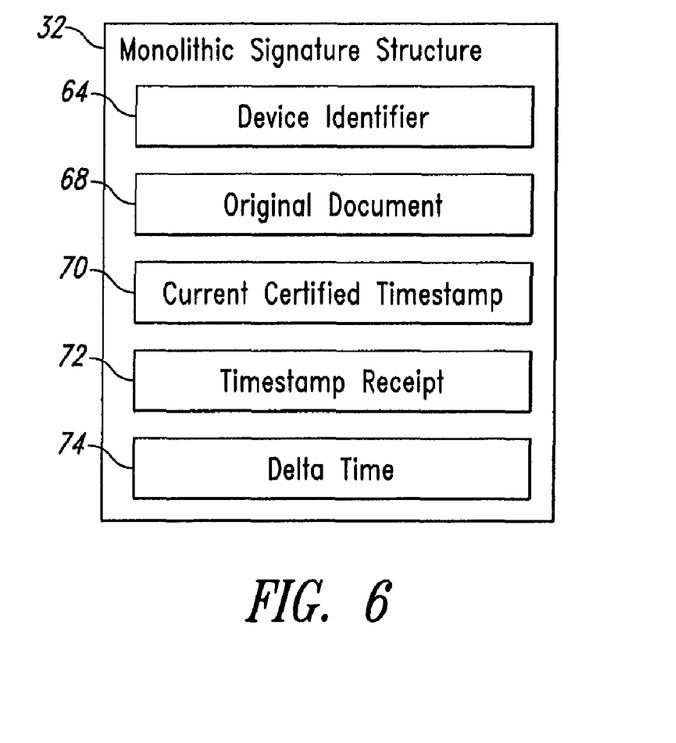
FIG. 6 is a schematic diagram of a certified digital file data structure returned by the certification device to the mobile computing system according to one illustrated embodiment.

FIG. 6 shows one illustrated embodiment of a data structure for the digitally signed certified digital file in the form of a monolithic signed digital file structure comprising the device identifier 64, a copy 68 of the original digital file 30 (FIGS. 3A and 3B), a copy 70 of the current certified timestamp 26, a copy 72 of the certified timestamp receipt 28 and an indication of one or more elapsed times 74. The monolithic file structure ensures that components of the signed digital file 32 may not be removed, changed, substituted or otherwise tampered, without rendering the signed digital file 32 invalid.

Figure 7:
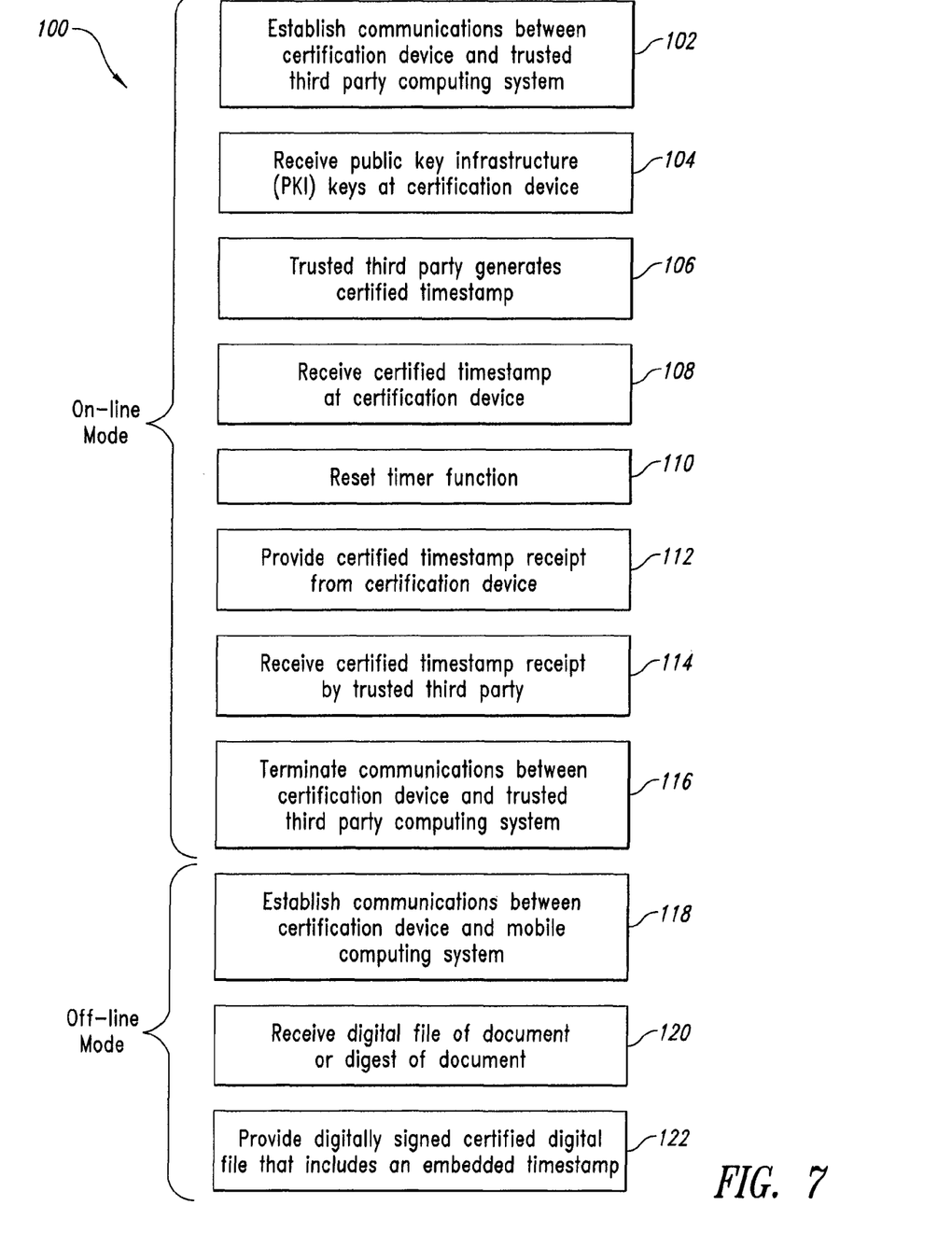
FIG. 7 is a flow diagram of a method of certifying files according to one illustrated embodiment.

FIG. 7 shows a method 100 according to one illustrated embodiment, where the tamper-resistant certification device 10 operates in an on-line mode communicatively coupled to the third party computing system 12 and in an Off-line mode communicatively coupled to the mobile computing system 20.

At 102, communication is established between the tamper-resistant certification device 10 and the trusted third party 12. Optionally at 104, the tamper-resistant certification device 10 receives public key infrastructure (PKI) keys, for example, from the trusted third party computing system 12. At 106, the trusted third party computing system 12 generates a certified timestamp 26 (FIG. 2). At 108, the tamper-resistant certification device 10 receives the certified timestamp 26 from the trusted third party computing system 12. At 110, the processor 34 (FIG. 4) of the tamper-resistant certification device 10 resets the timer functions 40*a*, 40*b*. At 112, the tamper-resistant certification device 10 provides a certified timestamp receipt 28 (FIGS. 2 and 5) to the trusted third party computing system 12. At 114, the trusted third party computing system 12 receives the certified timestamp receipt 28. At 116, communications are terminated between the tamper-resistant certification device 10 and the trusted third party computing system 12.

At 118, communications are established between the tamper-resistant certification device 10 and the mobile computing system 20. At 120, the tamper-resistant certification device 10 receives a document or digestive document in the form of a digital file 30 (FIGS. 3A and 3B) from the mobile computing device 20. At 122, the tamper-resistant certification device 10 produces the digitally signed certified digital file 32 (FIGS. 3A and 3B), that includes the embedded timestamp 26, timestamp receipt 28, copy of contents of the digital file 30, and indication of the elapsed time 74 (FIG. 6).

The digitally signed certified digital file 32 constitutes non-repudiable evidence of the contents of the digital file 30 at a given date and time, within a defined tolerance defined by the elapsed or delta time, and which may be verified by the trusted third party.

Although specific embodiments of and examples for the certification system, tamper-resistant certification device and method of certification are described herein for illustrative purposes, various equivalent modifications can be made without departing from the spirit and scope of the invention, as will be recognized by those skilled in the relevant art. The teachings provided herein of the invention can be applied to document originating sources other than the mobile computing system generally described above, and may employ certification authorities other than the trusted third party computing system generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to The Handbook of Applied Cryptography, Menezes, van Oorschot and Vanstone, CRC Publishing, are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all certification systems and methods that operated in accordance with the claims. Accordingly, the invention is not limited by the disclosure, but instead its scope is to be determined entirely by the following claims.

The invention claimed is:

1. A method of producing certifications of digital files, the method comprising:
   from time-to-time in an on-line mode,
     receiving a certified time stamp at a tamper-resistant portion of a processor of a tamper-resistant certification device from a remote source remotely located with respect to the tamper-resistant certification device;
     in response to receiving the certified time stamp, providing a time stamp receipt to the remote source from the tamper-resistant portion of the processor; and
   from time-to-time, in an off-line mode,
     receiving a digital file for certification at the tamper-resistant portion of the processor via a non-tamper resistant portion of the processor;
     determining a temporal offset from a last receipt of one of the certified time stamps received at the tamper-resistant portion of the processor; and
     producing a certified digital file comprising the contents of the digital file, the time stamp receipt, and an indication of the determined temporal offset from the last receipt of one of the certified time stamps.

2. The method of claim 1 wherein receiving a certified time stamp at a tamper-resistant portion of a processor of a tamper-resistant certification device from a remote source remotely located with respect to the tamper-resistant certification device comprises receiving a certified time stamp communications comprising a digital signature from a trusted third party over a network communications link, where the digital signature authenticates the trusted third party as the source of the certified time stamp.

3. The method of claim 1 wherein providing a time stamp receipt to the remote source from the tamper-resistant portion of the processor comprises transmitting a time stamp receipt communication to a trusted third party over a network communications link where the time stamp receipt communication comprises a digital signature and the digital signature authenticating the tamper-resistant certification device as a sole source of the time stamp receipt.

4. The method of claim 1 wherein receiving a certified time stamp at a tamper-resistant portion of a processor from a remote source remotely located with respect to the tamper-resistant certification device occurs from time-to-time while the tamper-resistant certification device is in the on-line mode.

5. The method of claim 1 wherein receiving a digital file for certification at the tamper-resistant portion of the processor via a non-tamper resistant portion of the processor occurs from time-to-time while the tamper-resistant certification device is in the off-line mode.

6. A tamper-resistant certification device to produce certification of digital files, the tamper-resistant certification device comprising:
   a housing, having an interior and an exterior;
   at least one communications port accessible from the exterior of the housing;
   a processor received in the housing, the processor partitioned into a tamper-resistant portion and a non-tamper resistant portion, the processor coupled to the at least one communications port, and configured to:
   from time-to-time in an on-line mode,
     receive a certified time stamp at the tamper-resistant portion of the processor from a remote source remotely located with respect to the tamper-resistant certification device;
     in response to receipt of the certified time stamp, provide a time stamp receipt to the remote source from the tamper-resistant certification device; and
   from time-to-time, in an off-line mode,
     receive a digital file for certification at the tamper-resistant portion of the processor;

determine a temporal offset from a last receipt of one of the certified time stamps received at the tamper-resistant portion of the processor; and produce a certified digital file comprising the contents of the digital file, the time stamp receipt, and an indication of the determined temporal offset from the last receipt of one of the certified time stamps.

7. The tamper-resistant certification device of claim 6 wherein the processor is further configured to:

increment a time stamp receipt counter in the tamper-resistant portion of the processor upon receiving the certified time stamp at the tamper-resistant portion of the processor;

reset a timer function in response to receiving of the certified time stamp at the tamper-resistant portion of the processor; and provide a contents of the time stamp receipt counter in the time stamp receipt provided to the remote source from the tamper-resistant device.

8. The tamper-resistant certification device of claim 6 wherein the digital file is received for certification at the tamper-resistant portion of the processor from the non-tamper-resistant portion of the processor.

9. The tamper-resistant certification device of claim 6 wherein the tamper-resistant portion of the process is configured to receive the certified time stamp from the remote source from time-to-time while the tamper-resistant certification device is in on-line mode.

10. The tamper-resistant certification device of claim 6 wherein the tamper-resistant portion of the process is configured to receive the digital file for certification from time-to-time while the tamper-resistant certification device is in the off-line mode.

* * * * *